United States Patent [19]

Coran et al.

[11] 4,299,931
[45] Nov. 10, 1981

[54] COMPATIBILIZED POLYMER BLENDS

[75] Inventors: Aubert Y. Coran; Raman Patel, both of Akron, Ohio

[73] Assignee: Monsanto Company, St. Louis, Mo.

[21] Appl. No.: 128,704

[22] Filed: Mar. 10, 1980

[51] Int. Cl.$^3$ .................. C08F 8/00; C09L 53/00
[52] U.S. Cl. .......................... 525/95; 525/88; 525/107; 525/132; 525/191; 525/194; 525/212; 525/213; 525/285; 525/291; 525/292; 525/293; 525/294; 525/301; 525/315; 525/323; 525/324
[58] Field of Search ............... 525/88, 95, 107, 132, 525/191, 194, 212, 213, 285, 291, 292, 293, 294, 301, 315, 323, 324

[56] References Cited

U.S. PATENT DOCUMENTS

| | | | |
|---|---|---|---|
| 3,485,777 | 12/1969 | Gaylord | 525/232 |
| 3,909,463 | 9/1975 | Hartman | 525/94 |
| 4,078,017 | 3/1978 | Nagatoshi et al. | 525/419 |
| 4,104,210 | 8/1978 | Coran | 525/240 |
| 4,108,948 | 8/1978 | Pritchett | 525/240 |
| 4,181,581 | 1/1980 | Iwata et al. | 525/94 |
| 4,181,689 | 1/1980 | Nagatoshi et al. | 525/419 |

*Primary Examiner*—J. Ziegler
*Attorney, Agent, or Firm*—Larry R. Swaney

[57] ABSTRACT

Compatibilized polymer blends are described comprising a blend of olefin polymer, nitrile rubber, and a compatibilizing amount of block copolymer comprising nitrile rubber compatibilizing segments and olefin polymer compatibilizing segments.

31 Claims, No Drawings

COMPATIBILIZED POLYMER BLENDS

COMPATIBILIZED POLYMER BLENDS

This application relates to improved polymer blends of olefin polymer and nitrile rubber, and in particular, blends of enhanced compatibility due to the presence of a block copolymer comprising nitrile rubber compatibilizing segments and olefin polymer compatibilizing segments.

BACKGROUND OF THE INVENTION

Blends of olefin polymer and nitrile rubber are known. For example, see U.S. Pat. Nos. 3,909,463 and 4,104,210. Olefin polymers and nitrile rubber are largely incompatible with one another. Mutual incompatibility prevents the development of optimum properties in blends of these materials. Thus, if the compatibility of the blend components can be increased, improved blends may be obtained. This is because particles of one or another component in the blend will be smaller and less likely to act as flaws.

SUMMARY OF THE INVENTION

It has now been discovered that an improved composition comprising a blend of an olefin polymer and nitrile rubber can be prepared by the use of a compatibilization enhancing amount of a block copolymer comprising at least one molecular segment each of nitrile rubber and olefin polymer. Typically, improved compatibilized polymer blends comprise about 1–99 parts by weight of an olefin polymer, preferably a thermoplastic crystalline olefin polymer, and correspondingly, about 99–1 parts by weight of nitrile rubber having an average molecular weight of 50,000 or more, and at least about 0.1 weight percent of a block copolymer comprising nitrile rubber compatibilizing molecular segments and olefin polymer molecular compatibilizing segments. A preferred composition comprises a blend of about 10–90 parts by weight of olefin polymer, and correspondingly about 90–10 parts by weight of nitrile rubber, and 0.5–25 parts by weight of block polymer.

The term "block copolymer" means a material in which olefin polymer compatibilizing molecular segments and nitrile rubber compatibilizing molecular segments are chemically linked to one another. Examples of olefin compatibilizing segments are polybutadiene, polyisoprene, and polyalkenamer, as well as the olefin polymers themselves. Examples of nitrile rubber compatibilizing segments are epichlorohydrin polymer, polyamide, polyamine, acrylic polymer, and polyester, as well as nitrile rubber itself. Compatibilizing segments have chemical or physical affinity for olefin polymer or nitrile rubber. The compatibilizing block copolymer has affinity for both the olefin polymer and the nitrile rubber and its presence improves the compatibility between olefin polymer and nitrile rubber. Any thermoplastic uncross-linked block copolymer of nitrile rubber and olefin polymer is suitable for preparing the improved compatibilized blends of the invention. A block copolymer may be prepared by causing a reaction to form a bond between the olefin polymer and nitrile rubber. Preferably, only one bond is formed for each olefin polymer molecule and nitrile rubber molecule. Block copolymers containing more than one bond per molecule are satisfactory; but it is preferred that the number of bonds is not so high that the resulting copolymer is in the form of a network molecular structure and is no longer thermoplastic.

One embodiment of the invention relates to an especially effective class of block copolymers comprising segments of olefin polymer and nitrile rubber, said block copolymer being prepared from an olefin polymer containing one or more graft forming functional groups. More preferred block copolymers are prepared from olefin polymer and nitrile rubber each of which contain graft forming functional groups. Examples of satisfactory functional groups are carboxy-, halo-(preferably, chloro- or bromo-), amino-, groups derived from methylol phenolic material, hydroxy groups, epoxy groups, and sulfonyl, sulfonic acid or salt groups. Functional olefin polymer and functional nitrile rubber may be prepared by known techniques and some of these materials are commonly available. For example, functional groups may be provided during polymerization by copolymerizing an olefin and an unsaturated carboxylic acid. Alternatively, functional groups may be introduced by direct reaction with the polymer by known grafting reactions. The functional groups may react directly to form a block copolymer between the olefin polymer and nitrile rubber. In the absence of graft forming functional groups, it may be necessary to provide another reactant in order to form a block copolymer. For example, when the functional groups of the polyolefin and nitrile rubber are carboxy, a polyfunctional reactant such as a polyamine may react with the carboxy groups to form a block copolymer. Functionalized liquid nitrile rubbers having a molecular weight of about 500 to 50,000, preferably about 800 to 10,000, are especially preferred block copolymer precursors. Block copolymers which are derived from methylolphenolic modified olefin polymer or maleic modified olefin polymer and nitrile rubber containing amino groups are especially preferred.

Olefin polymer molecules are generally functionalized before they interact with nitrile rubber molecules. This is because functionalizing agents can generally react far more rapidly with rubber molecules than with molecules of olefin polymer. In the presence of comparable amounts of both olefin polymer and rubber, functionalizing agent could be depleted without enough reaction with olefin polymer; it could be used up by reaction with essentially only the rubber. In addition, some functionalizing agents such as dimethylol phenolic derivatives are highly active rubber curatives. Such agents would more likely gel the rubber than functionalize the olefin polymer; further, gelled rubber, even though it might become chemically bound to olefin polymer molecules, may not form a compatibilizing block polymer.

To insure that reaction occurs between functionalizing agent and olefin polymer, it is frequently advisable, and sometimes essential, that the olefin polymer be functionalized in the absence of rubber, before admixture with rubber in a later portion of the procedure. For example, olefin polymers should be functionalized by dimethylol phenolic derivatives in the absence of the usual types of high molecular weight nitrile rubber.

However, an olefin polymer can be functionalized in the presence of a relatively small amount of a preferably low molecular weight liquid nitrile rubber by the action of a highly active curative such as a peroxide. Here, molecules of a high concentration of olefin polymer are functionalized by a very small amount of free radical generator which form transient "molecules" of functionalized olefin polymer in which the functional groups are unpaired electrons of the so-formed polymeric free radical. The polymeric free radical (functionalized olefin polymer) then attacks the preferably low molecular weight nitrile rubber molecules to form the compatibilizing block copolymer molecules which contain molecular segments of both nitrile rubber and olefin polymer. A reduction in either the molecular weight or concentration of nitrile rubber suppresses the formation of rubber gel. Also, low molecular weight rubber molecules are mobile and can diffuse rapidly to the olefin polymer free radical sites for block polymer formation; the resulting compatibilizing block polymer molecules can also diffuse more rapidly to the olefin polymer-nitrile rubber interface to exert their compatibilizing effect.

Any essentially uncross-linked block copolymer of olefin polymer and nitrile rubber is suitable for preparing compatibilized blends of the invention. Examples of suitable block copolymers, methods for preparing them, and the types of linkages visualized between, for example, polypropylene (PP) and nitrile rubber (NBR) are shown as follows:

less being enough to cause sufficient block copolymer formation to enhance the compatibility of a blend of olefin polymer and nitrile rubber.

The compatibilizing block copolymer can be formed from compatibilizing segments as long as they are functionalized to mutually interact to form a link therebetween.

A suitable functionalized olefin polymer may be conveniently prepared by masticating olefin polymer, preferably at a temperature above its melting point, for a period of about 1–20 minutes, and 0.1 to 20 weight percent methylol phenolic material, in the presence of an activator (catalyst) which promotes reaction between methylol phenolic material and the olefin polymer. An example of a satisfactory activator is a Lewis acid. Another suitably functionalized olefin polymer may be prepared by causing an unsaturated carboxylic acid such as acrylic or methacrylic acid, maleic acid, anhydride, or ester, or N-substituted maleamic acid, to react in the presence of a free radical generator with olefin polymer, by known processes. For example, see U.S. Pat. No. 2,973,344. The resulting functionalized olefin polymer is then caused to react with a functional-

| LINKAGE | SYNTHESIS |
|---|---|
| 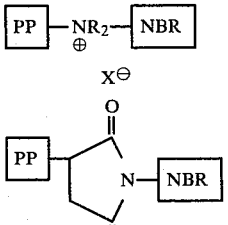 | Treat molten mixture of PP containing a small amount of low m.w. NBR with a small amount of peroxide. |
| | First halogenate polypropylene (slightly) then melt mix it with NBR which contains amine groups. |
| 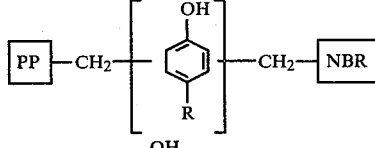 | First treat molten PP with maleic acid or anhydride (in presence of peroxide), then melt mix it with NBR containing amine groups (which can be introduced into NBR by LiAlH$_4$ reduction). |
| | First treat maleic modified PP with polyethylene-polyamine (e.g., DETA) then mix it with NBR which contains carboxyl groups. |
| 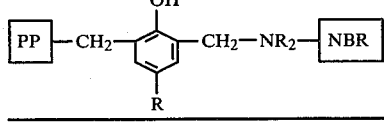 | First treat molten PP with dimethylolphenolic derivative (with catalyst) then melt mix it with NBR. |
| | First treat molten PP with dimethylolphenolic derivative (with catalyst) then melt mix it with NBR which contains amine groups. |

A block copolymer may be prepared by reacting a polypropylene with a liquid rubber and maleic anhydride in a solvent in the presence of a radical generator, for example, see U.S. Pat. No. 4,078,017, issued Mar. 7, 1978.

Generally, the amount of graft forming functional group does not exceed 10 weight percent of the olefin polymer or nitrile rubber. It can, however, be considerably lower with amounts in the vicinities of 1 percent or ized nitrile rubber.

Olefin polymers suitable for functionalization to give block polymer percursors comprise amorphous or crystalline essentially saturated homopolymers or copolymers of $C_2$–$C_8$ alpha monoolefins. Thermoplastic crystalline olefin polymers are especially preferred. An important subgroup of olefin polymers comprise high molecular weight solid products from the polymerization of one or more monoolefins by either high pressure or low pressure processes. Examples of such polymers are the isotatic or syndiotactic monoolefin polymers, representative members of which are commercially available. Satisfactory olefins include ethylene, propylene, 1-butene, 1-pentene, 1-hexene, 2-methyl-1-propene, 3-methyl-1-pentene, 4-methyl-1-pentene, 5-methyl-1-hexene, and mixtures thereof. Commercially available thermoplastic polyolefin resins, such as polyethylene, polybutene-1, and polypropylene, or mixtures thereof, may be advantageously used in the practice of the invention with polypropylene being preferred. Also suitable for the practice of the invention are copolymers of two or more olefins with copolymers of ethylene and propylene being preferred.

Any methylol phenolic material which will form a graft with olefin polymer may be used in the practice of the invention. Suitable methylol phenolic material may be prepared by condensation of unsubstituted phenol, a $C_1$-$C_{10}$ alkyl-p-substituted phenol, or halogen substituted phenol with an aldehyde, preferably, formaldehyde in an alkaline medium, or by condensation of phenol dialcohols. Methylol phenolic material includes polymeric phenols containing up to 10 benzene rings but preferred materials contain no more than three benzene rings. Especially preferred are methylol phenolic materials derived from dimethylol phenol substituted with $C_{5-10}$ alkyl groups preferably tertiary alkyl groups in the para position. Examples of satisfactory dimethylol phenolic materials are described in U.S. Pat. Nos. 2,972,600; 3,093,613; 3,287,440; 3,709,840, and 3,211,804, Column 5, lines 3-67, the disclosures of which are incorporated herein by reference. Halogenated, for example brominated, methylol phenolic materials are also suitable. These halogenated materials release, at elevated temperatures, hydrogen halide, which in the presence of a metal oxide such as zinc oxide, serves as an acidic activator. Suitable methylol phenolic materials are commercially available; for example, they may be purchased under the trade names of SP-1045, SP-1055, SP-1056, CRJ 352, and certain Arofene resins.

Any activator (catalyst) which promotes the graft formation between olefin polymer and methylol phenolic material is suitable for the practice of the invention. Preferred activators are Lewis acids which include the acid-acting metal halides such as boron trifloride, stannous chloride, zinc chloride, titanium tri- or tetrachloride, aluminum chloride, ferric chloride, ferric bromide, zinc bromide, aluminum bromide or complexes thereof. Suitable Lewis acids are described in U.S. Pat. No. 4,121,026, Columns 5-6, the disclosure of which is incorporated herein by reference.

Suitable nitrile rubbers comprise rubbery polymers of 1,3-butadiene or isoprene and acrylonitrile. Preferred nitrile rubbers comprise polymers of 1,3-butadiene and about 20-50 weight percent acrylonitrile. A "functionalized" nitrile rubber containing one or more graft forming functional groups is preferred for preparing block copolymer compatibilizers of the invention. The aforesaid "graft forming functional groups" are different from and are in addition to the olefinic and cyano groups normally present in nitrile rubber. Carboxylic-modified nitrile rubbers containing carboxy groups and amine-modified nitrile rubbers containing amino groups are especially useful for the preparation of block copolymers comprising segments of nitrile rubber. Any nitrile rubber, regardless of molecular weight, is suitable for the preparation of block copolymer, but, as indicated earlier, liquid nitrile rubbers having a molecular weight of less than 50,000 are preferred for this purpose. This contrasts with the nitrile rubber components of the blend which is a "solid" rubber having an average molecular weight of at least 50,000, and preferably, between about 100,000–1,000,000. Commercially available nitrile rubbers suitable for the practice of the invention are described in *Rubber World Blue Book*, 1975 edition, Materials and Compounding Ingredients for Rubber, pages 415–430.

The improved blends of the invention may be prepared by mixing olefin polymer, high molecular weight nitrile rubber, and block copolymer, preferably above the melting point of the olefin polymer by the use of conventional masticating equipment, for example, a rubber mill, Brabender Mixer, Banbury Mixer, or twin screw continuous mixer. Mixing times should be sufficient to obtain homogeneous blends. Satisfactory mixing times depend upon the types of olefin polymer and nitrile rubber and upon the type and amount of block copolymer. Typically, mixing times of about 2-30 minutes are satisfactory. If the polymer blend is obviously nonhomogeneous, additional mixing is required. When the blend components are thoroughly mixed, improved properties are obtained.

The compatibilized blends of the invention may be further improved by vulcanizing the nitrile rubber by conventional techniques. Vulcanizing agents are incorporated into the blends and the blends are heated to effect cure. The characteristics of the blends containing cured nitrile rubber depend upon the relative proportions of olefin polymer and nitrile rubber and whether the compositions are statically or dynamically cured. Static curing can give thermoset compositions when the blend contains more than 30 parts by weight of cured nitrile rubber per 100 parts by weight of olefin polymer; whereas, dynamic curing can give thermoplastic compositions even when the blend contains 80 or more parts by weight of cured nitrile rubber per 100 parts by weight of olefin polymer. Generally, compositions comprising 50 parts or more of cured nitrile rubber per 100 parts by weight of olefin polymer are elastomeric. The effect of the relative proportions on blend composition characteristics cannot be defined with precision because the limits vary depending upon a number of factors, such as, the kind of olefin polymer and nitrile rubber, the presence of fillers, plasticizers and other ingredients, and the extent the rubber is cured. Of course, it is understood that the properties of the compositions of the invention may be modified by the addition of ingredients which are conventional in the compounding of olefin polymer, nitrile rubber, and blends thereof. For additional information concerning compounding and dynamic vulcanization, refer to U.S. Pat. No. 4,104,210, issued Aug. 1, 1978. Compositions prepared by dynamic vulcanization comprising a blend of about 25-65 parts by weight of olefin polymer, preferably polypropylene, and correspondingly, about 75-35 parts by weight of cured nitrile rubber in the form of small particles (preferably 50 microns or less) dispersed throughout the olefin polymer, in which the blend has been compatibilized, prior to vulcanization, with a block copolymer comprising olefin polymer compatibilizing segments and nitrile rubber compatibilizing segments are especially preferred. Elastomer compositions generally contain no more than 55 parts of polypropylene per 100 parts of the composition.

Improved blend compositions of the invention can be used to form a variety of molded, extruded, or calendered articles. The properties of the blend depend upon the proportions of the components in the blend with a wide range of properties being available simply by varying the proportions of the blend components.

The stress-strain properties of the composition are determined in accordance with ASTM test procedures. For the compositions of Table 2, tests are carried out using a Microdumbbell tensile test specimen (ASTM D-1708-66) having a test length of 0.876 inches (2.23 cm.). An Instron tensile tester is used to pull the specimens apart during the test for tensile strength and ultimate elongation. The tester is designed to measure changes in jaw separation in inches. Though the initial jaw separation was adjusted to the ASTM procedure, to 0.90 inches (2.29 cm.) and the specimen length and jaw separation are not 1.00 inches (2.54 cm.), the elongation at break was read as the jaw separation increase, in inches. The percent ultimate elongation or elongation at break was calculated by multiplying the change in jaw separation required to break the specimen (measured in inches) by 100. It is true that the original unstrained sample length was 0.876 inches (not 1.00 inch) and one might expect that the change (in inches) in jaw separation should be divided by 0.876 inches as well as being multiplied by 100. However, it is also true that some flow of the specimen occurs in the jaws, which flow, in effect, somewhat increases the initial or unstrained length. Since the effective length change due to flow of the specimen in the jaws is difficult to measure in each case, and since the effect of this is in the opposite direction of not dividing by 0.876, it was found expedient to estimate the percent ultimate elongation or elongation at break, merely by multiplying the jaw separation at break (measured in inches) by 100. The actual value may deviate from this somewhat; however, the method presented herewith is incorporated into the definition for percent elongation used herein. Test specimens are pulled to 2.5 cm. per minute up to 30 percent elongation and 25.4 cm. per minute to failure. For the rest of the compositions (not in Table 2) ASTM D-638 was used.

DESCRIPTION OF PREFERRED EMBODIMENTS

Polypropylene having methylol phenolic groups grafted thereto is prepared by masticating polypropylene and methylol phenolic material at 80 rpm's with an oil bath temperature of about 180° C. in a Brabender Mixer. The ingredients are shown in Table 1.

TABLE 1

| | (a) | (b) | (c) | (d) |
|---|---|---|---|---|
| Polypropylene | 100 | 100 | 100 | 100 |
| SP-1045 | 2 | 2 | 2 | 4 |
| SnCl$_2$ . 2H$_2$O | — | 0.4 | 0.4 | 0.8 |
| MgO | — | — | 0.07 | — |

All parts are by weight. After the polypropylene (Profax ® 6723) is melted, dimethylol-p-octylphenol (SP-1045) is added and mixing is continued for 5 minutes. The mixture is then removed and passed through a mill to form a sheet. In Stocks (b), (c), and (d), after mixing the SP-1045 for 2 minutes, the indicated proportions of stannous chloride activator is then added and mixing is then continued for an additional 3 minutes. In Stock (c), 0.07 parts of magnesium oxide is added (to neutralize any free acid) and mixed for 1 additional minute. The stocks designated (b), (c), and (d) are used in the preparation of improved blend compositions of the invention. It should be noted that, though the oil bath temperature was about 180° C., the melt temperature generally reaches about 190° C. after the stannous chloride is added. The batch sizes are about 50–60 gm. and cam-type rotors are used.

If the temperature tends to rise above 190° C., the mixing speed is reduced to control the temperature at 190° C.

Compatibilized blends (Table 2) are prepared by masticating modified polypropylene and nitrile rubber in a Brabender mixer for 3 minutes after the polypropylene is melted. Stock 1 is a control containing unmodified polypropylene. Stock 2 is an improved composition of the invention where 50 parts by weight of modified polypropylene (Stock (b) of Table 1) are mixed with 50 parts by weight of nitrile rubber (Hycar 1092-80). In Stocks 3 and 4, the nitrile rubber is dynamically cured by melt mixing the blend with dimethylol phenolic curative. Enough residual cure activator is present in the modified polypropylene to activate the phenolic curative. The data show a substantial improvement in tensile strength and ultimate elongation by use of the modified polypropylene. This indicates graft formation between polypropylene and nitrile rubber. By functionalizing the polypropylene, the true stress at break nearly doubles. Stocks 3 and 4 show that curing the nitrile rubber results in further improvement in ultimate elongation and true stress at break.

TABLE 2

| | 1 | 2 | 3 | 4 |
|---|---|---|---|---|
| Polypropylene | 50 | — | — | — |
| Modified PP (b) | — | 50 | 50 | 50 |
| Nitrile Rubber | 50 | 50 | 50 | 50 |
| SP-1045 | — | — | 1.67 | 5.0 |
| Properties | | | | |
| TS, MPa | 7.2 | 10.1 | 10.5 | 11.6 |
| M$_{100}$, MPa | — | — | 10.2 | 11.5 |
| E, MPa | 182 | 170 | 157 | 153 |
| Elong., % | 24 | 66 | 170 | 130 |
| TSB, MPa | 8.9 | 16.8 | 28.4 | 26.7 |

In Table 3, compositions of the invention are illustrated in which the polyolefin-nitrile rubber block copolymer is derived from methylol phenolic modified polypropylene and amine-terminated nitrile rubber. The methylol phenolic modified polypropylene of Table 1 (Stocks (a), (b), and (c)) are mixed with a nitrile rubber masterbatch comprising 90 parts nitrile rubber and 10 parts amine-terminated nitrile rubber. The nitrile rubber is purchased as Hycar ® 1092-80 and the amine-terminated rubber is purchased as Hycar ® ATBN 1300X16. The modified polypropylene and the nitrile rubber masterbatch are mixed in a Brabender mixer at 180° C. for a period of about 5 minutes after the modified polypropylene is melted. In Stock 5, the blend is mixed for 30 minutes before adding the curative. During mixing, a block copolymer of amine-terminated nitrile rubber and the methylol phenolic modified polypropylene is formed. The blends are then dynamically vulcanized by the addition of phenolic curative in the quantities indicated. Mixing is continued until maximum Brabender consistency is obtained. The compositions are removed from the mixer then returned and mixed for 1 additional minute. The compositions are then cooled in a press and then compression molded at 210° C. Stock 1 is a control containing unmodified polypropylene. Stock 2 illustrates that very little, if any, block copolymer is formed when polypropylene and dimethylol phenolic material are masticated without activator. Stocks 3 through 5 illustrate compositions of the invention wherein block copolymers are prepared by causing amine-terminated nitrile rubber to react with polypropylene which had been functionalized with methylol phenolic material in the presence of activator. The enhanced compatibility (indicated by property improvements) of Stocks 3, 4, and 5, indicates that block copolymer had formed. For example, the properties of the composition of Stock 2 are about the same as control Stock 1 except for a slight increase in elongation; whereas, Stocks 3, 4, and 5 show a substantial increase in both tensile strength and elongation.

TABLE 3

|  | 1 | 2 | 3 | 4 | 5 |
|---|---|---|---|---|---|
| Polypropylene | 50 | — | — | — | — |
| Modified PP | — | 50(a) | 50(b) | 50(c) | 50(c) |
| Nitrile Rubber | 45 | 45 | 45 | 45 | 45 |
| ATBN-Nitrile Rubber | 5 | 5 | 5 | 5 | 5 |
| SP-1045 | 5 | 5 | 5 | 5 | 5 |
| $SnCl_2 \cdot 2H_2O$ | 0.5 | 0.5 | 0.5 | 0.5 | 0.5 |
| Mixing Time Before Curative, min. | 5 | 5 | 5 | 5 | 30 |
| Properties |  |  |  |  |  |
| TS, MPa | 9.6 | 9.8 | 15.3 | 16.5 | 20.1 |
| $M_{100}$, MPa | — | — | 10.2 | 9.9 | 10.1 |
| E, MPa | 149 | 105 | 107 | 106 | 106 |
| Elong., % | 36 | 79 | 390 | 420 | 450 |
| Tension Set, % | — | — | 54 | 54 | 54 |
| TSB, MPa | 13.1 | 17.5 | 75.0 | 85.8 | 111 |

It is noted that the longer mixing time of Stock 5 results in a vulcanized blend with extraordinarily high tensile strength. The extended mixing time probably results in a greater quantity of block copolymer being formed.

A study of curative levels is illustrated in Table 4. The compositions are prepared in the same manner as in Table 3, except the mixing time before curative addtion was 10 minutes and the modified polypropylene, Stock (d) of Table 1, is used. Also, antidegradants are added and mixed for 1 minute prior to removing the compositions from the mixer. The nitrile rubber and the amine-terminated nitrile rubber are the same as used in Table 3. Antidegradant 1 is polymerized 1,2-dihydro-2,2,4-trimethylquinoline, commercially available as Flectol ® H antioxidant. Antidegradant 2 is the zinc salt of 2-mercaptotolylimidazole, commercially available as Vanox ® ZMTI. Each of the compositions exhibit an excellent combination of properties including high tensile strength and a high ultimate elongation resulting in an excellent true stress at break. Higher curative levels give better tension set values (lower) but it causes a reduction in both tensile strength and elongation.

The effect of the relative proportions of polypropylene and nitrile rubber are illustrated in Table 5. The ingredients and the preparation procedures are the same as for the compositions of Table 4. The curative level is kept constant at 12.5 parts phenolic curative per 100 parts of nitrile rubber and the antidegradant levels are kept constant at 1.5 parts each by weight per 100 parts by weight of nitrile rubber. The data show that increasing the amount of modified polypropylene results in improved tensile strength and higher elongations. Increasing the amount of rubber results in improved tension set.

TABLE 4

|  | 1 | 2 | 3 | 4 | 5 | 6 |
|---|---|---|---|---|---|---|
| Modified PP (d) | 50 | 50 | 50 | 50 | 50 | 50 |
| Nitrile Rubber | 45 | 45 | 45 | 45 | 45 | 45 |
| ATBN-Nitrile Rubber | 5 | 5 | 5 | 5 | 5 | 5 |
| SP-1045 | 2.5 | 3.75 | 5.0 | 6.25 | 7.5 | 10.0 |
| $SnCl_2 \cdot 2H_2O$ | 0.5 | 0.5 | 0.5 | 0.5 | 0.5 | 0.5 |
| Antidegradant-1 | 0.75 | 0.75 | 0.75 | 0.75 | 0.75 | 0.75 |
| Antidegradant-2 | 0.75 | 0.75 | 0.75 | 0.75 | 0.75 | 0.75 |
| Properties |  |  |  |  |  |  |
| TS, MPa | 19.8 | 21.8 | 20.6 | 23.0 | 21.7 | 22.0 |
| $M_{300}$, MPa | 13.0 | 13.7 | 14.5 | 15.2 | 16.6 | 17.9 |
| E, MPa | 200 | 200 | 227 | 221 | 212 | 225 |
| Elong., % | 580 | 580 | 490 | 500 | 420 | 390 |
| Tension Set, % | 60 | 58 | 58 | 50 | 48 | 48 |
| TSB, MPa | 135 | 148 | 122 | 138 | 113 | 108 |

TABLE 5

|  | 1 | 2 | 3 | 4 | 5 |
|---|---|---|---|---|---|
| Modified PP(d) | 25 | 37.5 | 50 | 62.5 | 75 |
| Nitrile Rubber | 67.5 | 56.25 | 45 | 33.75 | 22.5 |
| ATBN-Nitrile Rubber | 7.5 | 6.25 | 5 | 3.75 | 2.5 |
| SP-1045 | 9.38 | 7.81 | 6.25 | 4.69 | 3.13 |
| $SnCl_2 \cdot 2H_2O$ | 1.13 | 0.78 | 0.5 | 0.28 | 0.13 |
| Antidegradant-1 | 1.13 | 0.94 | 0.75 | 0.56 | 0.38 |
| Antidegradant-2 | 1.13 | 0.94 | 0.75 | 0.56 | 0.38 |
| Properties |  |  |  |  |  |
| TS, MPa | 17.0 | 19.6 | 23.0 | 22.7 | 21.5 |
| $M_{300}$, MPa | 15.8 | 15.7 | 15.2 | 16.2 | 17.1 |
| E, MPa | 33 | 92 | 221 | 320 | 456 |
| Elong., % | 330 | 400 | 500 | 490 | 480 |
| Tension Set, % | 20 | 33 | 50 | 63 | 70 |
| TSB, MPa | 73 | 98 | 138 | 134 | 125 |

Compatibilized blends of the invention comprising polyethylene are illustrated in Table 6. Polyethylene having methylol phenolic groups grafted thereto (modified PE) is prepared using the procedure, proportions, and ingredients of Table 1, Stock (d) except high density polyethylene (Marlex ® EHM 6006) is substituted for polypropylene. Cured blends are prepared via dynamic vulcanization as described in Table 4. Stock 1 is a control containing no block copolymer. Stock 2 is a blend in which a block copolymer is formed in situ between methylol phenolic grafted polyethylene and nitrile rubber. Stock 3 is a blend in which block copolymer is formed in situ except 10 percent of the nitrile rubber is replaced by amine-terminated nitrile rubber. The nitrile rubber and amine-terminated liquid nitrile rubber (both the same type as in the compositions of Table 3) are added in the form of a preformed masterbatch. The data show that the blends containing the in situ formed copolymer exhibit substantially improved properties, indicative of improved compatability.

TABLE 6

|  | 1 | 2 | 3 |
|---|---|---|---|
| Polyethylene | 50 | — | — |
| Modified PE | — | 50 | 50 |
| Nitrile Rubber | 50 | 50 | 45 |
| ATBN-Nitrile Rubber | — | — | 5 |
| SP-1045 | 3.75 | 3.75 | 3.75 |
| $SnCl_2 \cdot 2H_2O$ | 0.5 | 0.5 | 0.5 |
| Properties |  |  |  |
| TS, MPa | 10.6 | 14.8 | 15.2 |
| E, MPa | 196 | 164 | 157 |
| Elong., % | 75 | 330 | 450 |

TABLE 6-continued

|  | 1 | 2 | 3 |
|---|---|---|---|
| Tension Set, % | Broke | 40 | 45 |
| TSB, MPa | 19 | 64 | 84 |

A study of the effect of the concentration of amine-terminated nitrile rubber in the in situ preparation of a block copolymer of maleic acid modified polypropylene and amine-terminated nitrile rubber (ATBN) and the enhanced compatibility of the resulting polypropylene-nitrile rubber blends are shown in Table 7. Maleic acid modified polypropylene is prepared by melt-mixing at about 185° C. and about 100 rpm in a Brabender mixer, 100 parts by weight of polypropylene (Profax 6723) and 5 parts by weight of maleic acid. After they are thoroughly mixed, 0.87 parts by weight of 2,5-dimethyl-2,5-bis(t-butylperoxy)hexane (90% active), (Lupersol® 101) is added and the mixing speed is increased to about 150–200 rpm. Mixing is continued until the consistency levels off (about 3 minutes) and, thus, indicates that reaction is complete. A nitrile rubber masterbatch, comprising 90 parts by weight of nitrile rubber (Hycar 1092-80) and 10 parts by weight of amine-terminated nitrile rubber (Hycar 1300X16, m.w. about 3000) is prepared by conventional means. Thermoplastic elastomeric compositions are prepared by dynamic vulcanization. Polypropylene, modified polypropylene, nitrile rubber, and nitrile rubber masterbatch are mixed in a Brabender for 5 minutes (stock temperature about 190° C.). The blend is removed, then returned to the mixer and mixed 5 additional minutes. The blend is then vulcanized by the addition of dimethylol-p-octylphenol, SP-1045, and stannous chloride cure activator. After adding the curative, the blend is masticated at about 185° C. until maximum consistency is achieved. The composition is removed, then returned and mixed for 2 additional minutes. The composition is removed, cooled, and then compression molded at 210° C. The amount of nitrile rubber masterbatch is varied as indicated. All parts are by weight.

The data show that improved compositions are obtained by the presence of block copolymer. The data show that the amount of amine-terminated liquid nitrile rubber can be reduced from 10% of the nitrile rubber of 2.5% thereof with the continued maintenance of the properties of the composition. The amount of amine-terminated nitrile rubber can be further reduced to as little as 0.16% of the nitrile rubber and still a significant improvement due to its presence is observed. A plot, on a log scale, of amine-terminated rubber concentration versus the improvement in tensile product, ultimate tensile strength times ultimate elongation, indicates that as little as 0.1% of the nitrile rubber needed be grafted to a portion of the polypropylene to give a noticeable improvement in mechanical properties.

Polypropylene (100 parts by weight) is modified by 4 parts by weight of a substituted maleic acid, namely, N-carboxymethyl maleamic acid (CMMA) or N-carbamoyl maleamic acid (CMA). Lupersol® 101 peroxide was used to promote modification, 0.087 parts by weight for CMMA and 0.174 parts by weight for CMA. Thermoplastic elastomeric compositions are prepared by dynamic vulcanization following the procedure and using the nitrile rubber masterbatch of Table 7. The data are shown in Table 8.

TABLE 7

|  | 1 | 2 | 3 | 4 | 5 | 6 | 7 | 8 |
|---|---|---|---|---|---|---|---|---|
| Polypropylene | 50 | 45 | 45 | 45 | 45 | 45 | 45 | 45 |
| Modified PP | — | 5 | 5 | 5 | 5 | 5 | 5 | 5 |
| Nitrile Rubber | 50 | 50 | 49.22 | 46.88 | 43.75 | 37.5 | 25 | — |
| NBR Masterbatch | — | — | 0.78 | 3.12 | 6.25 | 12.5 | 25 | 50 |
| SP-1045 | 3.75 | 3.75 | 3.75 | 3.75 | 3.75 | 3.75 | 3.75 | 3.75 |
| SnCl$_2$ . 2H$_2$O | 0.5 | 0.5 | 0.5 | 0.5 | 0.5 | 0.5 | 0.5 | 0.5 |
| ATBN-Conc., as of % rubber | 0 | 0 | 0.16 | 0.62 | 1.25 | 2.5 | 5.0 | 10 |
| Properties |  |  |  |  |  |  |  |  |
| TS, MPa | 8.8 | 12.0 | 12.4 | 15.2 | 22.0 | 25.5 | 25.7 | 26.7 |
| M$_{100}$, MPa | — | 12.0 | 12.1 | 12.0 | 12.3 | 12.3 | 12.5 | 12.9 |
| E, MPa | 209 | 200 | 212 | 223 | 185 | 188 | 184 | 237 |
| Elong., % | 19 | 110 | 170 | 290 | 400 | 440 | 430 | 540 |
| Tension Set, % | Broke | Broke | 45 | 40 | 40 | 40 | 42 | 45 |
| TSB, MPa | 10 | 25 | 33 | 59 | 110 | 138 | 136 | 171 |

TABLE 8

|  | 1 | 2 | 3 |
|---|---|---|---|
| Polypropylene | 50 | 25 | 25 |
| CMA-modified PP | — | 25 | — |
| CMMA-modified PP | — | — | 25 |
| NBR-masterbatch | 50 | 50 | 50 |
| Mixing time before curative addition, min. | 5 | 10 | 5 |
| SP-1045 | 5 | 5 | 5 |
| SnCl$_2$ . 2H$_2$O | 0.5 | 0.5 | 0.5 |
| Properties |  |  |  |
| TS, MPa | 9.6 | 15.6 | 19.3 |
| M$_{100}$, MPa | — | 12.3 | 12.8 |
| E, MPa | 149 | 147 | 209 |
| Elong., % | 36 | 270 | 420 |
| Tension Set, % | — | 38 | 43 |
| TSB, MPa | 13 | 58 | 100 |

The data show that blends containing block copolymer derived from amine-terminated nitrile rubber and polypropylene modified with substituted maleamic acid exhibit improved properties. The data also indicate that block copolymer from N-carboxymethyl maleamic acid modified polypropylene gives superior blends.

The importance of first functionalizing the polyolefin before causing it to react with the nitrile rubber to form a block copolymer is illustrated in Table 9. Improved compositions obtained from a block copolymer derived from a functionalized liquid nitrile rubber are also illustrated. Stocks 1–4 contain high molecular weight nitrile rubber and in Stocks 5–8 the nitrile rubber contains ten weight percent of liquid nitrile rubber, i.e., 45 parts of high m.w. nitrile rubber and 5 parts of liquid nitrile rubber containing amino groups. Stocks 1 and 5 are control blends prepared by melt mixing polypropylene and rubber. Stocks 2 and 6 are also control blends prepared by treating the blends of Stocks 1 and 4 with the indicated quantities of dimethylolphenolic material and activator. Stocks 3 and 7 illustrate improved blends are obtained by first introducing dimethylolphenolic groups in the polypropylene which subsequently forms a block copolymer with the nitrile rubber. Stocks 4 and 8 illustrate the additional improvement obtained by dynamic vulcanization of Stocks 3 and 7. The data show that superior blends result from the presence of a compatibilizing amount of block copolymer.

TABLE 10-continued

|  | 1 | 2 | 3 | 4 |
|---|---|---|---|---|
| E, MPa | 175 | 158 | 116 | 139 |
| Elong., % | 30 | 120 | 44 | 160 |
| TSB, MPa | 13 | 26 | 10 | 31 |

TABLE 11

|  | 1 | 2 | 3 | 4 | 5 | 6 |
|---|---|---|---|---|---|---|
| Polypropylene | 50 | — | 50 | — | 50 | 49 |
| Block Copolymer | — | — | — | — | — | 1 |
| $Cl_2$-Modified PP | — | 50 | — | — | — | — |
| MA-Modified PP Masterbatch | — | — | — | 50 | — | — |
| Nitrile Rubber (1092-80) | — | — | — | — | 50 | 50 |
| NBR Masterbatch | 50 | 50 | — | — | — | — |
| Carboxy-Nitrile Rubber | — | — | 50 | 50 | — | — |
| SP-1045 | 3.75 | 3.75 | 3.75 | 3.75 | 3.75 | 3.75 |
| $SnCl_2 \cdot 2H_2O$ | 0.5 | 0.5 | 0.5 | 0.5 | 0.5 | 0.5 |
| Properties |  |  |  |  |  |  |
| TS, MPa | 8.5 | 11.9 | 8.2 | 19.2 | 8.8 | 18.3 |
| $M_{100}$, MPa | — | 11.8 | — | 14.2 | — | 12.7 |
| E, MPa | 231 | 239 | 180 | 137 | 209 | 195 |
| Elong., % | 8 | 160 | 13 | 250 | 19 | 330 |
| Tension Set, % | Broke | 46 | Broke | 39 | Broke | 43 |
| TSB, MPa | 9 | 31 | 9 | 67 | 10 | 78 |

Compatibilized blends containing block copolymer prepared from amorphous polypropylene are shown in Table 10. A block copolymer is prepared by mixing at 190° C., 100 parts by weight of amorphous polypropylene (Afax® 900D), 2 parts by weight of maleic acid and 0.2 parts by weight of an organic peroxide (L-101). After 5 minutes, 25 parts by weight of an amine-terminated nitrile rubber (Hycar 1300X16) are added and mixing is continued for 3 additional minutes. Compatibilized blends of polypropylene, nitrile rubber, and block copolymer are prepared and subsequently cured by dynamic vulcanization. Stocks 1 and 3 are controls with the same quantities of amorphous polypropylene and amine-terminated nitrile rubber as in the block copolymer. The data show a substantial improvement in properties for Stocks 2 and 4 which contain the block copolymer.

Block copolymers prepared from chlorinated polypropylene and nitrile rubber, and maleic acid modified polypropylene and nitrile rubber containing carboxy groups are illustrated in Table 11. Polypropylene powder (Profax 6523) is chlorinated by passing chlorine through it at room temperature. It is then devolatilized to constant weight in an oven at 100° C. The treated polypropylene contains about ½ weight percent chlorine. A 50/50 blend of chlorinated-polypropylene and the nitrile rubber masterbatch containing 10% amine-terminated liquid nitrile rubber is prepared by melt mixing. During melt mixing, block copolymer is formed. A thermoplastic-elastomeric composition is prepared by dynamic vulcanization with phenolic curative, Stock 2. A similar blend is prepared with untreated polypropylene, Stock 1. The data show the blend containing block copolymer exhibits superior properties.

TABLE 9

|  | 1 | 2 | 3 | 4 | 5 | 6 | 7 | 8 |
|---|---|---|---|---|---|---|---|---|
| Polypropylene | 50 | 50 | — | — | 50 | 50 | — | — |
| Modified PP(d) | — | — | 52.4 | 52.4 | — | — | 52.4 | 52.4 |
| Nitrile Rubber (Hycar® 1032) | 50 | 50 | 50 | 50 | — | — | — | — |
| NBR Masterbatch | — | — | — | — | 50 | 50 | 50 | 50 |
| SP-1045 | — | 2.0 | — | 3.75 | — | 2.0 | — | 3.75 |
| $SnCl_2 \cdot 2H_2O$ | — | 0.4 | — | 0.5 | — | 0.4 | — | 0.5 |
| Properties |  |  |  |  |  |  |  |  |
| TS, MPa | 10.2 | 10.4 | 14.4 | 19.4 | 9.9 | 10.1 | 11.1 | 17.2 |
| $M_{100}$, MPa | — | — | 10.7 | 12.1 | 9.8 | 10.2 | 10.3 | 11.2 |
| E, MPa | 230 | 200 | 219 | 197 | 212 | 206 | 201 | 190 |
| Elong., % | 69 | 73 | 580 | 380 | 110 | 140 | 280 | 530 |
| Tension Set, % | Broke | Broke | 64 | 43 | Broke | Broke | 75 | 55 |
| TSB, MPA | 17 | 18 | 98 | 93 | 21 | 24 | 42 | 108 |

TABLE 10

|  | 1 | 2 | 3 | 4 |
|---|---|---|---|---|
| Polypropylene | 46 | 46 | 42 | 42 |
| Amorphous PP | 4 | — | 8 | — |
| Block Copolymer | — | 5 | — | 10 |
| Nitrile Rubber | 49 | 49 | 48 | 48 |
| ATBN-Nitrile Rubber | 1 | — | 2 | — |
| SP-1045 | 3.75 | 3.75 | 3.75 | 3.75 |
| $SnCl_2 \cdot 2H_2O$ | 0.5 | 0.5 | 0.5 | 0.5 |
| Properties |  |  |  |  |
| TS, MPa | 9.7 | 11.7 | 6.7 | 11.9 |
| $M_{100}$, MPa | — | 11.7 | — | 10.8 |

Polypropylene is functionalized with maleic acid by melt mixing 100 parts by weight polypropylene (Profax 6723) and 5 parts by weight of maleic acid. After a homogeneous mixture is obtained, one part by weight of organic peroxide (Lupersol ® 101) is added and mixing is continued until a constant consistency is obtained. A masterbatch is prepared by melt mixing 90 parts by weight of virgin polypropylene, 10 parts by weight of the above maleic acid modified polypropylene, and 0.15 parts by weight of triethylenetetramine. A blend of 50 parts by weight of triethylenetetramine treated, maleic acid modified polypropylene masterbatch and 50 parts by weight of carboxynitrile rubber (Hycar ® 1072 CG) were melt mixed during which time the triethylenetetramine derived moiety forms a bridge between carboxy groups of the nitrile rubber. The compatibilized mixture is then dynamically vulcanized with phenolic curative. Stock 3 is a control with unmodified polypropylene. The data shows that the compatibilized composition exhibits substantially improved properties.

A block copolymer is prepared by boiling for 15 minutes, one part by weight of maleic acid modified polypropylene (same as in Table 7), and one part by weight of amine-terminated nitrile rubber (Hycar 1300×16) in 86 parts by weight of xylene. After cooling, and by the addition of an equal volume of acetone, the block copolymer is precipitated. A compatibilized blend is prepared by melt mixing and dynamic vulcanization of 49 parts by weight of polypropylene, one part by weight of the block copolymer (prepared above), 50 parts by weight of nitrile rubber, and the indicated amount of phenolic curative. The properties are shown in Table 11, Stock 6. Stock 5 is a control without block copolymer. The data show a substantial improvement in properties as the result of the addition of a small quantity of block copolymer.

An improved compatibilized blend can contain a block copolymer having a nitrile rubber compatibilizing segment derived from low molecular weight polyamide. A composition of the invention is prepared by melt mixing at 190° C., 50 parts by weight of phenolic modified polypropylene (Stock (d) of Table 1), 50 parts by weight of nitrile rubber (Hycar 1092-80) and one part by weight of low molecular weight polyamide (Versamid PA 140, amine number 370-400). The mixture is masticated for ten minutes. Phenolic curative is then added and the mixture is dynamically vulcanized. Another composition is prepared in a similar manner except without any polyamide. The properties are shown in Table 12. The data show a substantial improvement in tensile strength and elongation indicating enhanced compatibilization for the composition containing a block copolymer derived from polyamide.

TABLE 12

|  | 1 | 2 |
|---|---|---|
| Modified PP (d) | 50 | 50 |
| Nitrile Rubber | 50 | 50 |
| Versamid PA 140 | — | 1 |
| SP-1045 | 2.5 | 2.5 |
| SnCl$_2$ . 2H$_2$O | 0.5 | 0.5 |

TABLE 12-continued

|  | 1 | 2 |
|---|---|---|
| Properties |  |  |
| TS, MPa | 10.6 | 14.9 |
| M$_{100}$, MPa | 10.5 | 11.7 |
| E, MPa | 191 | 204 |
| Elong., % | 190 | 360 |
| TSB, MPa | 31 | 69 |

Compatibilized blends containing block copolymers containing various compatibilizing segments are illustrated in Table 13. A modified nylon block copolymer is prepared by melt mixing in a Brabender mixer at 230° C. under nitrogen, 100 parts by weight of nylon 6,6,6, 6–10 copolymer (Zytel 63) and 100 parts by weight of a liquid carboxylated butadiene rubber (Hycar 2000×162). After mixing 3 minutes, ten parts by weight of an epoxy resin (Epon 1007, epoxide equivalent=2000-2500) are added and mixing is continued for 5 additional minutes. The nylon block copolymer is removed, cooled, and used as an additive in Stock 2. Other block copolymers are prepared in situ by melt mixing the reactants in a Brabender mixer. The blends are prepared by melt mixing and dynamic vulcanization as before. The polypropylene, nitrile rubber, and NBR masterbatch are the same as in Table 7. Versamid PA 140 is a liquid polyamide having as in Table 7. Versamid PA 140 is a liquid polyamide having an amine value of 370-400 prepared from dimerized fatty acid and polyamine. Unirez 2641-D is a polyamide, m.p. 133°–143° C. prepared from dimer acids. CTB rubber is a liquid carboxylated butadiene rubber (Hycar 2000×162).

TABLE 13

|  | 1 | 2 | 3 | 4 | 5 | 6 | 7 |
|---|---|---|---|---|---|---|---|
| Polypropylene | 50 | 45 | 45 | 45 | 45 | 45 | 45 |
| Nitrile Rubber | 50 | 45 | 45 | 47.5 | — | — | — |
| NBR-masterbatch | — | — | — | — | 50 | 50 | 50 |
| CTB-rubber(a) | — | — | 5 | 5 | 5 | — | — |
| nylon b.copolymer | — | 10 | — | — | — | — | — |
| Versamid PA 140(a) | — | — | — | 2.5 | — | — | — |
| Unirez 2641D(a) | — | — | 5 | — | — | — | — |
| Polycure 1001 | — | — | — | — | — | 5 | — |
| EEA Resin 455 | — | — | — | — | — | — | 5 |
| SP-1045 | 2.5 | 2.5 | 2.5 | 2.5 | 2.5 | 2.5 | 2.5 |
| SnCl$_2$ . 2H$_2$O | 0.5 | 0.5 | 0.5 | 0.5 | 0.5 | 0.5 | 0.5 |
| Properties |  |  |  |  |  |  |  |
| TS, MPa | 8.7 | 10.1 | 9.0 | 8.7 | 9.0 | 10.7 | 9.7 |
| M$_{100}$, MPa | — | 10.0 | 9.0 | — | 8.9 | — | — |
| E, MPa | 233 | 170 | 150 | 154 | 123 | 209 | 170 |
| Elong., % | 19 | 140 | 110 | 90 | 140 | 90 | 100 |
| TSB, MPa | 10 | 24 | 19 | 17 | 22 | 20 | 19 |

(a)Mixed first with the nitrile rubber

Polycure 1001 is a thermoplastic propylene-acrylic acid copolymer, m.p. 168° C. EEA Resin 455 is an ethyleneacrylic acid (8%) copolymer, melt index 5.5. Stock 1 is a control without any block copolymer. The data (especially the higher elongations) show that the presence of block copolymer enhances the compatibility between nitrile rubber and polypropylene.

Although the invention has been illustrated by typical examples, it is not limited thereto. Changes and modifications of the examples of the invention herein chosen for purposes of disclosures can be made which do not constitute departure from the spirit and scope of the invention.

The embodiments of the invention in which an exclusive property or privilege is claimed are defined as follows:

1. A compatibilized polymer composition comprising a blend of thermoplastic olefin polymer, nitrile rubber having an average molecular weight of 50,000 or more, and, in a compatibilization enhancing amount, a block copolymer comprising at least one nitrile rubber compatibilizing segment and at least one olefin polymer compatibilizing segment.

2. The composition of claim 1 in which the block copolymer is derived from an olefin polymer containing one or more graft forming functional groups.

3. The composition of claim 2 in which the block copolymer is derived from a nitrile rubber containing one or more graft forming functional groups.

4. The composition of claim 3 in which the olefin polymer and nitrile rubber functional groups are different.

5. The composition of claim 4 in which the block copolymer is prepared from a liquid nitrile rubber having an average molecular weight of about 500 to 50,000.

6. The composition of claim 5 comprising about 1-99 parts by weight of olefin polymer and correspondingly about 99-1 parts by weight of nitrile rubber, and about 0.5 to 25 weight percent of block copolymer.

7. The composition of claim 2 in which graft forming functional groups are selected from the group consisting of carboxy, halo, amino, and a functional group derived from methylol phenolic material.

8. The composition of claim 6 in which the graft forming functional group is selected from the group consisting of carboxy, halo, amino, and a group derived from methylol phenolic material.

9. The composition of claim 8 in which the block copolymer is prepared from olefin polymer and nitrile rubber, each of which contain functional groups which react to form block copolymer.

10. The composition of claim 9 in which the olefin polymer is thermoplastic crystalline polypropylene.

11. The composition of claim 10 in which the block copolymer is prepared from olefin polymer containing a graft forming functional group derived from methylol phenolic material.

12. The composition of claim 10 in which the block copolymer is prepared from olefin polymer containing a graft forming functional group derived from unsaturated acid.

13. The composition of claim 12 in which the block copolymer is prepared from olefin polymer containing a graft forming functional group derived from maleic acid or anhydride.

14. The composition of claim 11 in which the block copolymer is prepared from nitrile rubber containing amino groups.

15. The composition of claim 13 in which the block copolymer is prepared from nitrile rubber containing amino groups.

16. The composition of claim 10 in which the rubber is cured.

17. The composition of claim 16 in which the blend comprises about 25-65 parts by weight of polypropylene, and about 75-35 parts by weight of cured nitrile rubber in the form of small particles dispersed throughout the polypropylene.

18. The composition of claim 5 in which the block copolymer is prepared in situ.

19. The composition of claim 11 in which the block copolymer is prepared in situ.

20. The composition of claim 12 in which the block copolymer is prepared in situ.

21. A block copolymer comprising at least one segment each of nitrile rubber and an olefin polymer, said copolymer being derived from an olefin polymer containing one or more graft forming functional groups.

22. The copolymer of claim 21 derived from a nitrile rubber containing one or more graft forming functional groups.

23. The copolymer of claim 22 in which the olefin polymer and nitrile rubber functional groups are different.

24. The copolymer of claim 21 in which the functional groups are selected from the group consisting of carboxy, halo, amino, and a group derived from methylol phenolic material.

25. The copolymer of claim 24 in which the nitrile rubber is a liquid rubber having an average molecular weight of about 500 to 50,000.

26. The copolymer of claim 25 in which the olefin polymer is polypropylene or polyethylene.

27. The copolymer of claim 26 in which the olefin polymer is crystalline polypropylene.

28. The copolymer of claim 27 in which the nitrile rubber contains amino groups.

29. The copolymer of claim 28 in which the olefin polymer contains functional groups derived from methylol phenolic material.

30. The copolymer of claim 28 in which the olefin polymer contains functional groups derived from unsaturated acid or anhydride.

31. The copolymer of claim 30 in which the acid or anhydride is maleic.

* * * * *